Oct. 30, 1945.   E. L. LUACES   2,387,763
RECOVERY OF CARBON BISULPHIDE
Filed June 14, 1939
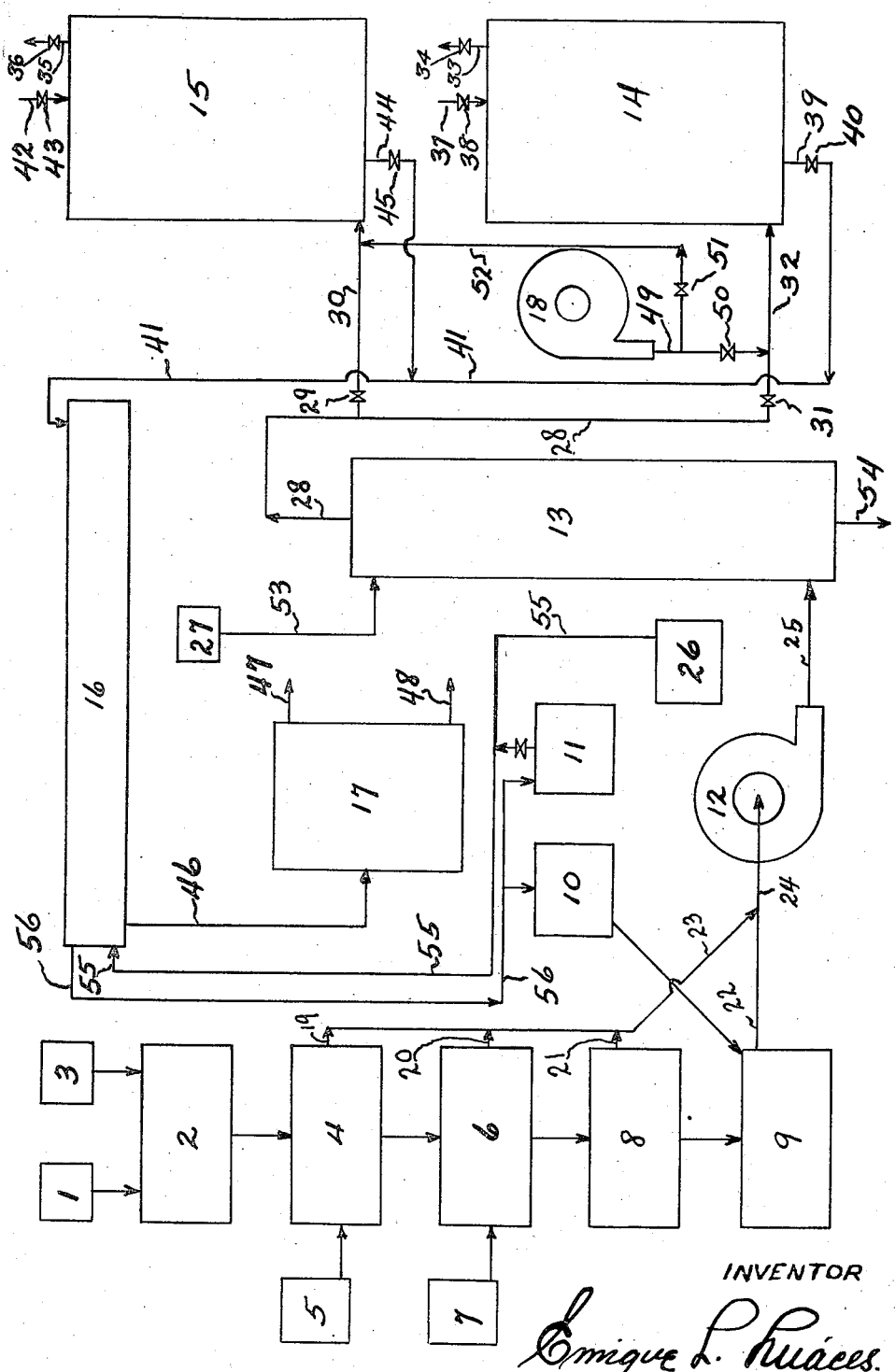
INVENTOR
Enrique L. Luaces.

Patented Oct. 30, 1945

2,387,763

UNITED STATES PATENT OFFICE 2,387,763

RECOVERY OF CARBON BISULPHIDE

Enrique L. Luáces, Woodhaven, N. Y., assignor, by mesne assignments, to Research and Development Corporation, Wilmington, Del., a corporation of Delaware Application June 14, 1939, Serial No. 279,011

12 Claims. (Cl. 23—206)

This invention relates to recovery of carbon bisulphide and has for its object certain improvements in method for such recovery. The invention more particularly contemplates a novel method especially useful for the continuous recovery of carbon bisulphide lost in the manufacture of viscose products.

In the manufacture of viscose products raw cellulose material is treated with caustic soda to produce so-called "alkali cellulose." After aging, the alkali cellulose is caused to react with carbon bisulphide to form so-called "cellulose xanthate." During this reaction heat is generated and carbon bisulphide is driven off.

One object of this invention is to recover this carbon bisulphide.

When the reaction has been completed the xanthate is dissolved in weak caustic solution and the resulting viscous mass or "viscose" is stored at low temperature to mature. When the proper degree of ripeness has been attained the viscose solution is forced or extruded through fine orifices or slits into an acid coagulating bath. If the viscose solution is extruded through the orifices of a spinnerette, filaments such as make up a rayon yarn are formed. If the viscose solution is forced through a thin slit a film or sheet corresponding to Cellophane will be formed. The viscose solution may, however, be cast in suitable molds to form articles of various types and shapes. In any event, coagulation of the viscose solution regardless of the physical shape or form in which it is done, decomposes it with the formation of regenerated cellulose. Hydrogen sulphide, carbon bisulphide and other compounds are formed as by-products of the reaction. These by-products are at present a total waste.

A second object of this invention is to recover the carbon bisulphide produced as a by-product of this reaction.

The regenerated cellulose contains a substantial amount of carbon bisulphide and is called "green" viscose. It is customary to remove the residual carbon bisulphide and other products picked up from the coagulating bath by washing with running water, in a centrifugal, or with a spray. At the present time, the carbon bisulphide in the green unwashed regenerated cellulose is lost during the washing operation.

A third object of this invention is to recover this carbon bisulphide.

Methods hitherto used for the extraction of carbon bisulphide from freshly prepared viscose products have not been fully successful. Vacuum extraction causes a chilling of the "green" viscose and damages it; heat extraction causes a swelling and likewise damages it.

A fourth object of this invention is to extract carbon bisulphide from freshly prepared viscose products at a temperature and under conditions controlled to prevent such deleterious effects.

Methods hitherto used for the recovery of the carbon bisulphide vapors driven off in the production of viscose products have likewise not been fully successful. The concentration of carbon bisulphide vapors in the air collected around the various points where they are driven off is extremely low, and recovery methods based upon direct condensation or on refrigeration cannot successfully be applied. Liquid absorption methods likewise suffer because of the low concentration of vapors in the vapor-laden air. Adsorption on a solid adsorbent such as activated carbon has been only partially successful, because hydrogen sulphide present in the vapors collected materially reduces the effectiveness of the adsorbent.

A fifth object of this invention is the separation of hydrogen sulphide and other impurities present in the vapors collected and the subsequent recovery by adsorption with a solid adsorbent such as activated carbon of the carbon bisulphide vapors.

The invention will be better understood by referring to the attached drawing (taken in conjunction with the following description), which is a schematic representation or flow sheet of the principal steps in the viscose process and of an apparatus illustrative of a practice of the invention, adapted, for example, to the recovery of carbon bisulphide in the production of viscose rayon.

The flow sheet shows a source of raw cellulose material 1 to be treated with caustic, causticizing vessel 2 in which the raw cellulose material is treated with caustic soda from source 3 to yield "alkali cellulose," reaction vessel 4 in which the alkali cellulose is caused to react with carbon bisulphide from source 5 to form cellulose xanthate, vessel 6 in which the xanthate is dissolved with a weak caustic solution from source 7 to form viscose, acid coagulating bath 8 in which the viscose solution is decomposed to regenerated cellulose and by-products including hydrogen sulphide and carbon bisulphide, and washing bath 9 wherein the regenerated cellulose is washed free of by-products of the coagulating reaction with wash water from source 10.

The illustration further shows a cooling tower 11, blower 12, scrubbing tower 13, alternate adsorbers 14 and 15, condenser 16, decanter 17, fan 18, suction lines or ducts 19, 20, 21, 22, 23 and 24, blower discharge line 25, water source 26 and liquid absorbent source 27. Conduit 28 connects the upper part of scrubbing tower 13 with the lower part of adsorber 15 through valve 29 and conduit 30; and the lower part of adsorber 14 through valve 31 and conduit 32. Adsorber 14 is vented to the atmosphere through conduit 33 and valve 34, and adsorber 15 is vented to the atmosphere through conduit 35 and valve 36.

A steam inlet 37 provided with a valve 38 connects a source of steam (not shown) with the upper part of adsorber 14, while a distillate discharge conduit 39 provided with a valve 40 joins the lower part of adsorber 14 with a conduit 41 connecting the upper part of condenser 16.

Similarly a steam inlet 42 provided with a valve 43 connects a source of steam (not shown) with the upper part of adsorber 15, while a distillate discharge conduit 44 provided with a valve 45 joins the lower part of adsorber 15 with said conduit 41 connecting the upper part of condenser 16.

A condensate discharge line 46 connects the lower part of the condenser 16 with decanter 17. Outlet lines 47 and 48 discharge water and liquid carbon bisulphide, respectively, from the decanter.

Fan 18 connects through discharge conduit 49, valve 50 and conduit 32 the lower part of adsorber 14; and through discharge conduit 49, valve 51, conduit 52 and conduit 30 the lower part of adsorber 15.

Conduit 53 connects source of absorbent in liquid form 27 with the upper part of scrubbing tower 13, and conduit 54 discharges said absorbent in liquid form at the lower part of said scrubbing tower 13.

A cooling water inlet 55 connects cooling tower 11 and source of water 26 with the lower end-part of condenser 16. A cooling water outlet 56 is located on the upper end-part of the condenser, and connects wash water source 10 and cooling tower 11.

The apparatus above described is advantageously operated as follows in a preferred practice of the invention for the recovery and extraction of carbon bisulphide in the production of viscose rayon.

Referring to the illustration, carbon bisulphide from source 5 is caused to react with alkali cellulose in vessel 4. This reaction causes the generation of heat and large volumes of carbon bisulphide vapors are driven off. A further volume of carbon bisulphide vapors is given off from vessel 6, wherein the cellulose xanthate is dissolved in weak caustic, and from coagulating bath 8 and washing bath 9.

These vapors are collected mixed with large volumes of air in hoods (not shown) fitted around the points of evaporation, and carried through suction lines or ducts 19, 20, 21, 22, 23 and 24 connected to blower 12, which discharges them at the lower part of scrubbing tower 13.

The air-vapor mixture passes upwardly through tower 13, which is advantageously provided with a packing of pebbles, Raschig rings, or some similar substance affording large surface for contact and reduced rate of flow.

An absorbent in liquid form is caused to flow from source 27 through line 53 and thence downwardly through scrubbing tower 13, wherein it intimately contacts the air-vapor mixture flowing upwardly through said scrubbing tower, and removes therefrom hydrogen sulphide and other impurities.

The absorbent in liquid form to which reference is made is selected from among those compounds which will absorb hydrogen sulphide and other components (but not carbon bisulphide) from the air-vapor mixture. Besides hydrogen sulphide and carbon bisulphide there might be present entrained sulphuric acid, sulphates, etc.

Ammonium hydroxide is a suitable absorbent. It will remove from the air-vapor stream hydrogen sulphide and sulphuric acid by chemical interaction, but will not react with nor remove any substantial quantity of carbon bisulphide.

Methylene blue in solution is another suitable absorbent. It will remove hydrogen sulphide by chemical interaction and other impurities by simple scrubbing, but will not react with nor remove any substantial quantity of carbon bisulphide. It has the advantage that it may be regenerated and used over again, with alternate oxidation and reduction.

Certain ammonia substitution compounds in which one or more of the hydrogen atoms of the ammonia are replaced by a group containing carbon and hydrogen are likewise useful for removing hydrogen sulphide by chemical interaction and can be regenerated by simply heating them at reasonably moderate temperatures. These properties, however, are possessed only by a limited number of these amines, which have certain general characteristics as to the arrangement of atoms in their molecules. For instance, while oxygen may be present, it may not be in the form of carboxyl or carbonyl groups, although it may be present as a hydroxyl group.

It is known that aliphatic amines remove acidic constituents from gaseous mixtures. Primary amines have the highest capacity and tertiary amines the lowest. Primary amines react with carbon bisulphide to form stable thiourea derivatives. Secondary amines react with carbon bisulphide to a lesser degree and the resulting compounds are less stable. Pure tertiary amines do not react with carbon bisulphide.

While pure tertiary amines are not generally obtainable at the present time, I prefer to use them because of the higher carbon bisulphide recovery made possible thereby. Tertiary amines containing reasonably low proportions of primary and secondary amines may be used, particularly if the quantity of primary amine is relatively low and that of tertiary amine relatively high.

An example is triethanolamine. It has characteristics making it particularly useful. It is non-corrosive and easy to handle; has a low vapor pressure and low volatility; will absorb hydrogen sulphide with a high degree of efficiency and under ideal working conditions, but will not combine with carbon bisulfide; it may be regenerated at reasonable temperature and has no offensive odor.

There are other compounds with similar properties, as will be evident to those skilled in the art.

The air-vapor stream from which hydrogen sulphide and other impurities have been removed by the absorbent in liquid form leaves the upper part of the scrubbing tower 13 through conduit 28, and passes through valve 29 and conduit 30 into the lower part of adsorber 15.

The adsorber is provided with a horizontally disposed bed or beds of solid adsorbent. As an example, an activated carbon such as described by Albert Godel in United States Letters Patent 1,674,897 dated June 26, 1928, proves highly satisfactory.

In passing through the adsorber, the air-vapor stream is denuded of its carbon bisulphide content, and the stripped or denuded air passes out through conduit 35 and valve 36. This is called the "adsorption cycle," and as an example last ninety minutes.

At the end of this period of ninety minutes, valves 31 and 34 are opened and the air-vapor stream permitted to flow through conduit 32 into adsorber 14 and the stripped or denuded air to escape through conduit 33.

Valves 29 and 36 on adsorber 15 are then closed. Valves 45 and 43 are then opened, permitting the passage of steam into adsorber 15 and the exit of distillate containing the previously adsorbed carbon bisulphide. The distillate passes through conduits 44 and 41 into condenser 16, which is supplied with cooling water from cooling tower 11 and source 26 through conduit 55.

The heated cooling water leaving the condenser through conduit 56 is delivered to vessel 10 in a quantity sufficient to supply the requirements of washing bath 9, and the rest is delivered to cooling tower 11 to be conditioned for reuse.

The steaming operation to which reference has been made is called the "desorption cycle," and as an example may last forty-five minutes. At the end of that time valves 43 and 45 are closed.

Due to the passage of the steam through adsorber 15 and its contents, including the beds or bed of activated carbon, they are left in a warm and wet state. They must be cooled to place the adsorber in condition for reuse, and may be advantageously dried. This is accomplished by forcing a stream of air through the adsorber. To this end valves 51 and 36 are opened and air from fan 18 caused to pass through conduits 49, 52 and 30 into the lower part of adsorber 15. The air passes through the adsorber and is permitted to escape through conduit 35 and valve 36.

The adsorbers are advantageously provided with a heat regenerator in the lower section and a layer of solid adsorbent material in the upper section. Thus, the regenerator may consist of a layer of stones of suitable size to provide adequate interstices for the ready passage therethrough of gaseous vapors, steam and air. The steam passed through the adsorber in the desorption cycle transmits part of its heat load to the regenerator, the layer of stones in this case. The heat regenerator therefore becomes hot, and is still hot as air is passed through it in the drying and cooling operation.

The passage of air therethrough gradually cools down the regenerator, as the heat picked up by the air is transmitted to the activated carbon. The moisture held by the activated carbon is thus evaporated, and the water vapor is withdrawn from the system. The proportion of heat regenerating mass to adsorbent mass is regulated so that by the time the adsorbent mass has dried, the heat has been dissipated from the heat regenerating mass. Thereafter, the air passing through the heat regenerating mass does not increase in temperature; the adsorbent mass is gradually cooled down to ambient temperature; the air remains at ambient temperature; and the adsorbent mass is cooled to substantially the same temperature.

As an example, the drying and cooling cycle may last forty-five minutes.

When the adsorption cycle of ninety minutes on adsorber 15 is terminated, adsorber 14 is placed in the adsorption cycle and adsorber 15 undergoes desorption, drying and cooling.

The operative steps for adsorber 14 subsequent to the adsorption cycle are identical to those previously described for adsorber 15 and need not be repeated here.

In the practice of the process as just described, it will be noted that after the adsorbers are alternately in and out of adsorptive service, adsorber 14 will be in adsorptive service while adsorber 15 is being subjected to its cycles of steaming, drying and cooling, and adsorber 15 will be in adsorptive service while adsorber 14 is being subjected to its cycles of steaming, drying and cooling.

As has been stated hereinbefore, the heated cooling water leaving condenser 16 through conduit 56 is discharged into wash water source 10 in quantity sufficient for the requirement of washing bath 9, and the balance is discharged into cooling tower 11 where it is conditioned for reuse.

Since part of the cooling water is used in washing freshly coagulated viscose products in bath 9, it is necessary to replace it, plus the evaporation loss in the cooling tower, from source 26.

It is advantageous to control the temperature of the heated cooling water discharged to wash water source 10 in order to keep the temperature of washing bath 9 above the boiling point of carbon bisulphide. I have found that if the temperature of washing bath 9 is controlled substantially within the range of 50–70° C., and particularly above 65° C., highly satisfactory results are obtained in driving off vapors of carbon bisulphide without any deleterious effects on the freshly coagulated viscose products.

It is known that certain advantages may be had by washing freshly coagulated viscose products with solutions having a controlled osmotic pressure or being isotonic with respect to regenerated cellulose. Organic and inorganic products and combinations or mixtures thereof are used in the preparation of such solutions, and in a present practice of my invention such products may be added to the heated cooling water in source 10 to form such isotonic solution.

Examples of such products are sodium and magnesium sulphates, sulphuric acid, sulphonated oils, saponins, etc.

While for the sake of simplicity I have described and illustrated an apparatus for the carrying out of my process using only two adsorbers, it will be clearly understood that it is possible to make use of either less or more adsorbers.

For example, it is advantageous to make use of three adsorbers in order to obtain a continuous flow of heated cooling water from condensers 16 through conduit 56 into washing water source 10. In that manner there will be always one adsorber in the adsorption cycle, one in the desorption cycle, and one in the drying and cooling cycle. Since the steaming operation is then carried on continuously from one adsorber to another, the flow of heated cooling water from condenser 16 to washing water source 10 will be likewise continuous.

Having now described and illustrated one form of my invention, I wish it to be understood that my invention is not to be limited to the specific form or arrangement of parts herein shown and described, since it will be clear to those skilled in this art that the process and apparatus just described are only an illustration of a practice of the invention, and that the principles thereof are adapted to cover other modifications.

I claim:

1. The method of recovering carbon bisulphide from freshly coagulated viscose products which comprises: washing said products at a temperature above 65° C. but not above 70° C., collecting the vapors driven off, effecting intimate contact of said vapors with a regenerative absorbent in liquid form substantially non-absorbent and inert towards carbon bisulphide which will remove hydrogen sulphide therefrom, and thereafter effecting intimate contact of the residual vapors with a solid adsorbent which will adsorb carbon bisulphide therefrom.

2. The method of recovering carbon bisulphide from freshly coagulated viscose products according to claim 1 in which the solid adsorbent is activated carbon.

3. In the method of recovering carbon bisulphide from freshly coagulated viscose products according to claim 1 the step of making the wash solution isotonic with respect to regenerated cellulose by the addition of at least one substance selected from the group consisting of alkali metal salts, alkaline earth metal salts, inorganic acids, organic acids, sulphonated oils and saponins which are chemically inert towards regenerated cellulose and carbon bisulphide.

4. In the method of recovering carbon bisulphide in the production of viscose products by collecting the carbon bisulphide-containing vapors given off during processing, effecting intimate contact of said vapors with a regenerative absorbent in liquid form substantially non-absorbent and chemically inert towards carbon bisulphide which will remove hydrogen sulphide from said vapors, thereafter effecting intimate contact of the residual vapors with activated carbon to adsorb carbon bisulphide therefrom, desorbing the activated carbon with steam, and condensing the products of desorption, in combination, the step of contacting said residual vapors with activated carbon in at least three adsorbers of the type adapted to operate in successive cycles of adsorption, desorption, and cooling, said desorption and cooling being solely by direct application of desorptive and cooling fluids, whereby at least one adsorber is undergoing desorption at all times, said adsorbers being provided with built-in heat regenerating means, the further step of condensing the products of desorption by continuously passing them through at least one heat interchanger cooled with water, and the further step of applying the effluent cooling water to freshly coagulated viscose products, whereby carbon bisulphide is liberated therefrom.

5. In the method of recovering carbon bisulphide according to claim 4 the further step of controlling the temperature of the effluent cooling water at above 65° C., but not above 70° C.

6. In the method of recovering carbon bisulphide in the production of viscose products by collecting the carbon bisulphide vapors given off during processing in admixture with air, effecting intimate contact of said vapors with a regenerative absorbent in liquid form substantially non-absorbent and chemically inert towards carbon bisulphide which will remove hydrogen sulphide from said vapors, thereafter effecting intimate contact of the residual vapors with activated carbon to adsorb carbon bisulphide therefrom, desorbing the activated carbon with steam, and condensing the products of desorption, in combination, the step of contacting said residual vapors with activated carbon in at least three adsorbers of the type adapted to operate in successive cycles of adsorption, desorption, drying and cooling, said desorption, drying and cooling being solely by direct application of desorptive, drying and cooling fluids, whereby at least one adsorber is undergoing desorption at all times, said adsorbers being provided with heat regenerating means, the further step of condensing the products of desorption by continuously passing them through at least one heat interchanger cooled with water, the further step of controlling the flow of water through said heat interchanger in proportion sufficient with respect to the products of desorption passed therethrough to heat said water to a temperature above 65° C. but not above 70° C. at the effluent point of said heat interchanger, and the further step of applying said effluent water to freshly coagulated viscose products, whereby carbon bisulphide is liberated therefrom.

7. The method according to claim 1 in which the regenerative absorbent includes an amine selected from the group consisting of aliphatic amines free from carboxyl and carbonyl groups and having a boiling point substantially above room temperature.

8. The method according to claim 1 in which the regenerative absorbent includes a tertiary aliphatic amine having a boiling point substantially above room temperature.

9. The method according to claim 1 in which the regenerative absorbent includes an ethanolamine having a boiling point substantially above room temperature.

10. The method according to claim 1 in which the regenerative absorbent includes triethanolamine.

11. The method according to claim 1 in which the regenerative absorbent includes methylene blue.

12. The method according to claim 1 in which the absorbent in liquid form includes ammonium hydroxide.

ENRIQUE L. LUÁCES.